No. 823,670. PATENTED JUNE 19, 1906.
F. N. DENISON.
TEA STRAINER AND INFUSER.
APPLICATION FILED APR. 21, 1905.

Witnesses.
Inventor.
F. N. Denison
by
his Atty.

UNITED STATES PATENT OFFICE.

FRANCIS NAPIER DENISON, OF VICTORIA, CANADA.

TEA STRAINER AND INFUSER.

No. 823,670.     Specification of Letters Patent.     Patented June 19, 1906.

Application filed April 21, 1905. Serial No. 256,762.

*To all whom it may concern:*

Be it known that I, FRANCIS NAPIER DENISON, of Victoria, in the district of Victoria, British Columbia, Canada, have invented certain new and useful Improvements in Tea Strainers and Infusers, of which the following is a specification.

My invention relates to improvements in tea strainers and infusers; and the object of the invention is to devise a device of this class which will do away with the presence of tannic acid in the tea after the first few moments necessary for the proper infusing of the tea, and, further, to provide means whereby the leaves are prevented from being poured into cups and at the same time obviate the necessity of cleaning the pot; and a further object is to dispense with the annoyance of the old way of cleaning the teapot by rinsing.

To these ends my invention consists in a cover provided with an orifice, a gauze receptacle provided with a reinforcing top edge, a perforated cap for the same suitably held on the top of the receptacle and provided with an upwardly-extending stem designed to extend through the perforation in the lid or cover, and a lifting-stem pivotally connected to the top of the aforesaid stem and capable of lateral compression, the parts being arranged and constructed in detail, as hereinafter more particularly explained.

Figure 1:
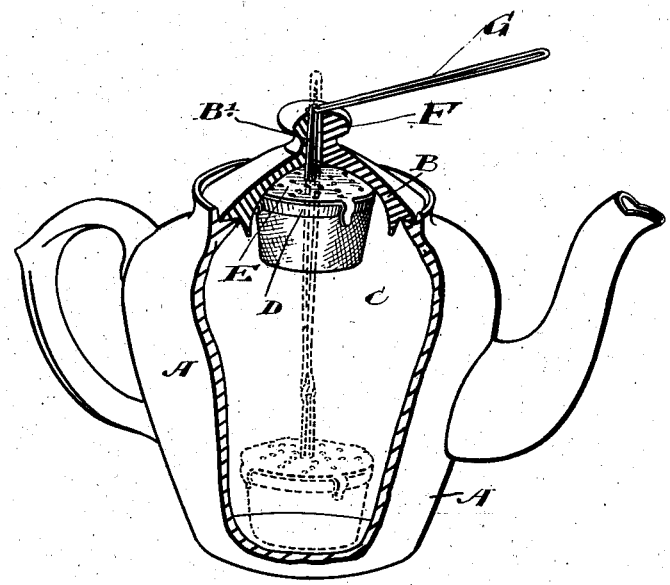
Figure 2:
Figure 3:
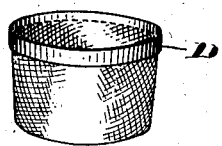
Figure 4:
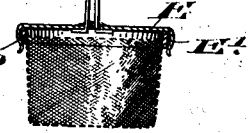

Figure 1 is a sectional perspective view of a teapot provided with my improved strainer and infuser. Fig. 2 is a perspective detail of the perforated top, stem, and lifting-stem. Fig. 3 is a detail of the gauze receptacle or cup. Fig. 4 is a vertical sectional view through the cup and cover, showing the manner of connecting the cover to the cup.

In the drawings like letters of reference indicate corresponding parts in each figure.

A is the teapot, which is provided with a lid or cover B, of any suitable form and provided with a perforation B', preferably in the center of the knob.

C is a gauze cup of any suitable form and provided, preferably, with a reinforcing top annular bead or edge ring D, to which the upper edge of the gauze forming the major portion of the cup is suitably attached.

E is a cover for the cup which is provided with depending spring-lips E', whereby the cover may be held onto the cup by such lids extending over the reinforcing-ring D and whereby also the cover may be readily removed from the top of the cup by radial withdrawal and receding of the lips sufficiently.

F is a stem made, preferably, of double wire and formed with an upper loop F'.

G is a longitudinal stem which is formed of spring-wire and is pivotally connected to the top of the stem F. The lifting-wire G is a double wire and is capable of lateral compression and expansion, being resilient, as hereinbefore indicated.

The tea is placed in the cup D, and the cover is then placed on top of the cup. In so connecting the cup and the cover together the teapot-lid B may be removed with the cover E of the cup close thereto, the lifting-stem G being turned over, as indicated in Figs. 1 and 2, and the cup being filled with tea-leaves such cup may be forced into position under the cover. If preferred, however, the cup and cover may be completely removed from the lid of the tea-pot by withdrawing the stems F and G through the hole B' in the top of the lid. The gauze cup C must be then separated from the cover and the tea-leaves put in and then the parts put together again and the stem passed upwardly through the hole B' in the lid. The boiling water now having been placed in the teapot the tea strainer and infuser may be then placed into the position shown in dotted lines in Fig. 1 or in any position between such position and the position shown in full lines, the spring lifting-stem B serving to hold the cup C in any position in which it may be placed by the lateral pressure thereof.

Although I show my stem as formed in two parts, it will of course be understood that the stem may be in one part with any suitable form of top, and the lateral pressure of the spring lifting-stem will serve to hold the cup C in the desired position. I, however, prefer the form which I have shown in the drawings.

Among the advantages arising from my tea strainer and infuser are that the leaves from the tea after infusing may be removed by raising the cup, C and thus prevent the bitter taste and injurious effects of the tannic acid contained in the leaves from pervading the tea, the leaves are prevented from being poured into the cups, the cleansing of the teapot is dispensed with, and the tea may be constant at any strength required. All these advantages may be obtained without raising the lid to remove the tea-containing receptacle from the pot.

In this specification it will be noticed that

I describe the stem as made in two parts F G, and this is for the purpose of enabling a cozy being used on the teapot.

What I claim as my invention is—

1. In a tea infuser and strainer, the combination with the pot and the lid having an opening therein, of a perforated tea-receptacle and a divided stem having a lower portion connected to the receptacle and an upper lifting portion pivotally connected to the lower portion and having lateral resiliency as and for the purpose specified.

2. The combination with the pot having a gauze or similar receptacle having a reinforcing annular bead or edge, of a perforated cover having spring-lips designed to grip such edge and a wire stem secured to the cover and designed to extend through the hole in the lid of the teapot and a wire removing-stem pivotally connected to the top of the aforesaid stem and having a lateral spring or resiliency as and for the purpose specified.

FRANCIS NAPIER DENISON.

Witnesses:
C. A. HOLLAND,
A. R. WOLFENDER.